United States Patent [19]

Offutt

[11] 3,762,064

[45] Oct. 2, 1973

[54] TIMER WITH CYCLE AND TIME DEPENDENT RUNOUT FOR DRYER

[75] Inventor: Carl R. Offutt, St. Joseph, Mich.

[73] Assignee: Whirlpool Corporation, Benton Harbor, Mich.

[22] Filed: Nov. 12, 1971

[21] Appl. No.: 198,201

[52] U.S. Cl. .............................. 34/45, 34/48, 34/33

[51] Int. Cl. ......................... F26b 3/02, F26b 19/00

[58] Field of Search ..................... 34/31, 45, 53, 55, 34/48, 43; 328/48

[56] References Cited

UNITED STATES PATENTS

| | | | |
|---|---|---|---|
| 3,660,909 | 5/1972 | Willcox | 307/118 |
| 3,471,938 | 10/1969 | Elders | 34/45 |
| 3,471,939 | 10/1969 | Janke | 34/45 |
| 3,402,478 | 9/1968 | Hetrick | 318/483 |

*Primary Examiner*—Meyer Perlin
*Assistant Examiner*—Paul Devinsky
*Attorney*—James S. Nettleton et al.

[57] ABSTRACT

Apparatus for controlling the operation of a dryer includes means for selecting a desired dryness condition, a circuit to sense for a predetermined dryness condition during a drying operation, a circuit for determining the elapsed time interval in attaining the predetermined dryness condition, and means for extending the drying operation by an interval of time which is a function of the elapsed sensed drying time and the selected dryness condition to improve repeatability in percent moisture retention from load to load, particularly with respect to loads which are difficult to dry.

9 Claims, 17 Drawing Figures

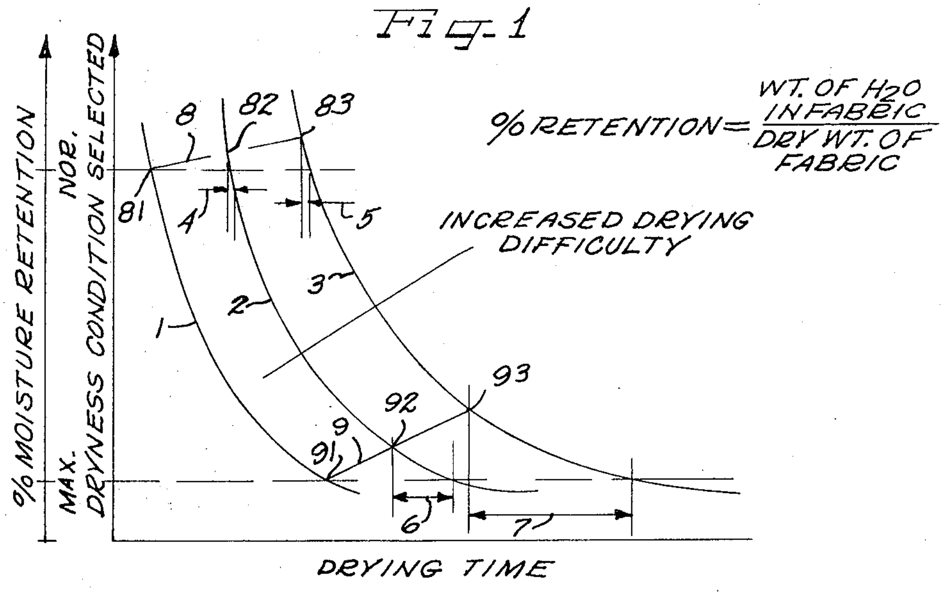
Fig-1
Fig-2
SENSED DRYING TIME—MIN.
| DRYNESS CONDITION SELECTED | | 0-10 | 11-20 | 21-30 | 31-40 | 41-50 | 51-60 | 60+ |
|---|---|---|---|---|---|---|---|---|
| MAX. | A | — | 8 | 10 | 12 | 14 | 16 | 18 |
| | B | — | 2 | 4 | 6 | 8 | 10 | 12 |
| | C | — | — | 2 | 4 | 6 | 8 | 10 |
| | D | — | — | — | 2 | 4 | 6 | 8 |
| NORM. | E | — | 2 | 2 | 2 | 4 | 4 | 4 |
| | F | — | — | — | — | — | — | — |
| | G | — | — | — | — | — | — | — |
| DAMP | H | — | — | — | — | — | — | — |
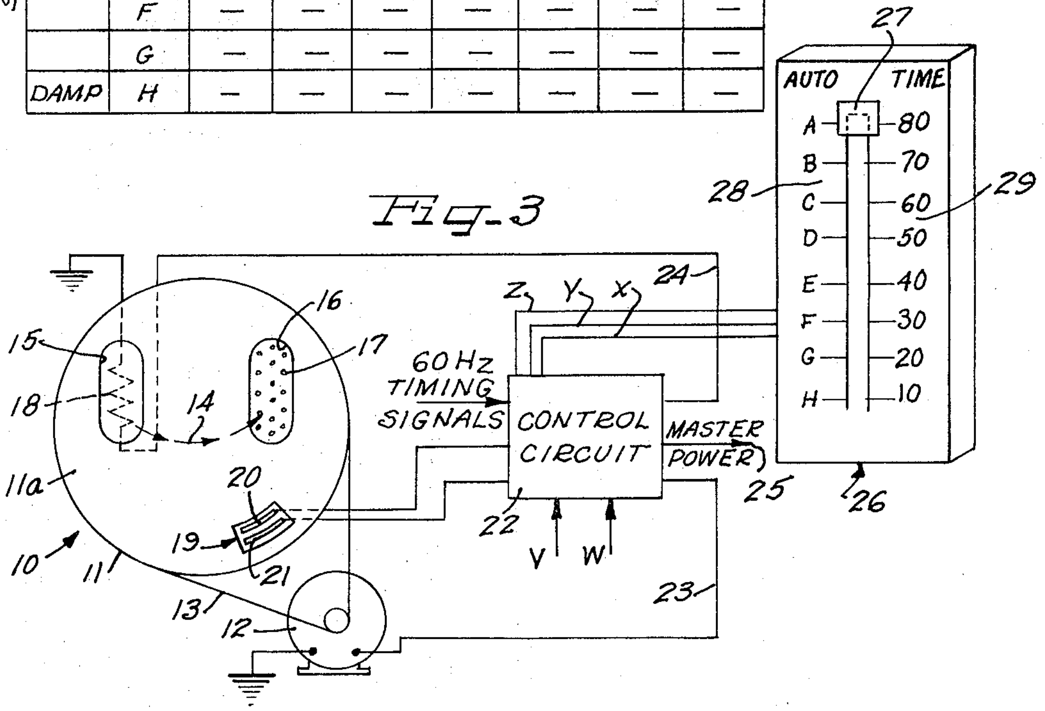
Fig-3

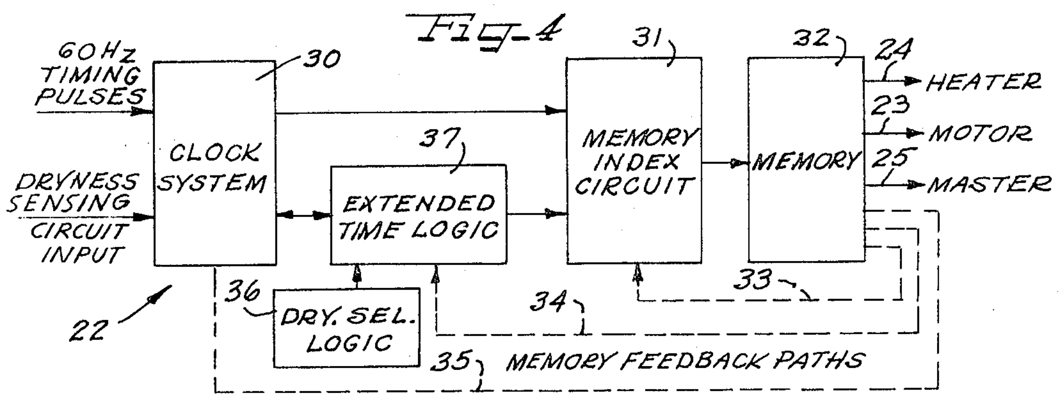
Fig-4
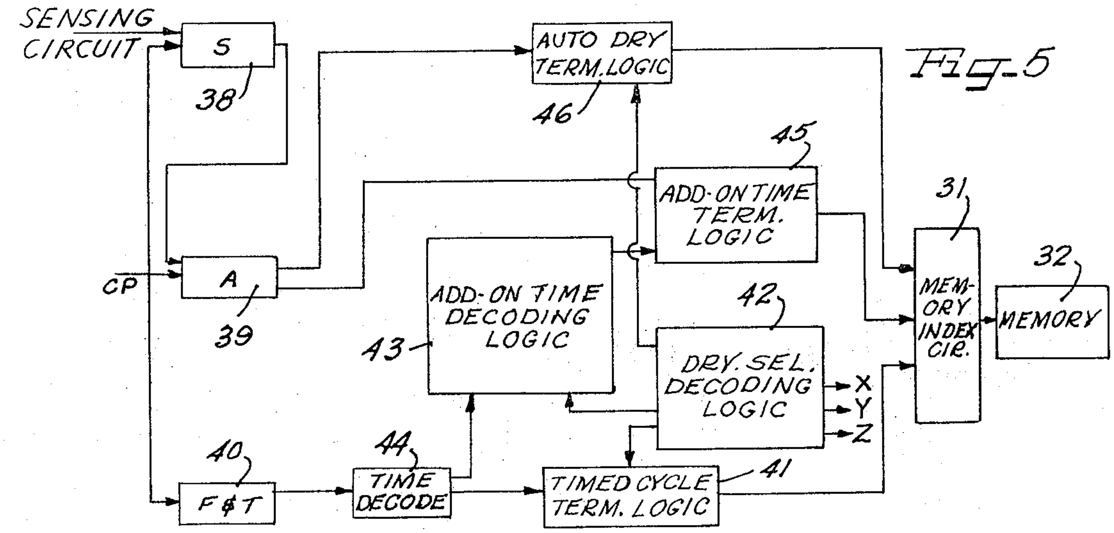
Fig-5
Fig-6
| SWITCH | FUNCTION |
|---|---|
| X<br>Y<br>Z | 3 BINARY CODED INPUTS FROM<br>AN 8 POSITION DRYNESS SELECTION SW.<br>FOR TIMED AND SENSED CYCLES |
| W | CYCLE SELECTION SW. 0=SENSED 1=TIMED |
| V | ANTI-WRINKLE CYCLE SW. 1=ON 0=OFF |
| MEMORY STATE | | | DRYER OPERATION |
|---|---|---|---|
| M1 | M2 | M3 | |
| 0 | 0 | 0 | DRY |
| 1 | 0 | 0 | EXTENDED DRYING PERIOD |
| 0 | 1 | 0 | TUMBLE—NO HEAT |
| 1 | 1 | 0 | ANTI-WRINKLE CYCLE |
| 0 | 0 | 1 | OFF |
Fig-7

INPUT INVERTER

TIME COUNTER DECODING 44

DRY. SEL. DECODING 42

TIMED CYCLE TERM. 41

TIMER WITH CYCLE AND TIME DEPENDENT RUNOUT FOR DRYER

BACKGROUND OF THE INVENTION

1. Field of the Invention

This invention relates to techniques, including both method and apparatus, for controlling the operation of a dryer and is particularly concerned with the provision of a dryer control comprising means for selecting a desired dryness condition and means for extending dryer operation beyond the point at which a predetermined dryness condition is sensed by an interval which is a function of the preselected dryness condition and the amount of time accumulated in attaining the predetermined dryness condition.

2. Description of the Prior Art

Certain fabrics, particularly those fabrics composed of man-made synthetic fibers, tend to dry easier than other fabrics. In order to accommodate the difference in basic types of fabric, dryer cycles have been provided which permit selection of drying times and temperatures. Heavy articles of clothing are generally difficult to dry because of pockets, seams or the like, as are towels, blankets and rugs which have a nap or upstanding fibers which extend from a core. Articles of this type present a completely different type of drying problem in that the exterior of such an article which contacts a moisture sensor of a dryer has less moisture retention than the interior of the article so that a predetermined desired moisture retention level may be prematurely sensed by the moisture sensor causing a premature termination of the drying operation. One remedy is, of course, to perform a second drying operation. This remedy is, however, undesirable in that it requires additional work for the operator and the requisite additional drying time is an unknown quantity which varies from load to load. Another solution known in the art is to add a fixed amount of time to the drying operation through the provision of a fixed timer runout. The addition of a fixed amount of time has the drawback that there is no flexibility in providing for a predetermined moisture retention and results in excessive drying of some fabrics and insufficient drying of other fabrics.

In their United States patent application, Ser. No. 198,354, filed Nov. 12, 1971, and assigned to Whirlpool Corporation, Donald E. Janke, Roque Marcade and Joseph Karklys disclose a method and an apparatus for operating a dryer to obtain a desired moisture retention in the load undergoing drying wherein a moisture sensing circuit searches for a predetermined dryness condition, the time accumulated in reaching the predetermined dryness condition is determined and the drying operation is variably extended for an interval beyond the point at which the predetermined dryness condition is sensed in relation to the accumulated time interval. The extended interval of drying operation may have any desired relationship with respect to the duration of the sensed drying interval including a proportional relationship, or a stepped relationship wherein a certain amount of time is added whenever the sensed drying operation extends beyond predetermined times. This type of control has provided improved performance in a drying operation; however, if one plots a sensor performance curve on a family of drying performance curves, it can be seen that the sensor performance varies not only with the length of the sensed drying interval, but also with the desired dryness condition selected. In order to provide greater accuracy in a drying operation the interval of time added to the drying operation should be dependent on the length of the sensed drying interval and the dryness condition selected. Therefore, the present invention is considered to be an improvement over the control disclosed by Janke et al.

SUMMARY OF THE INVENTION

The primary object of the present invention is to provide improved method and apparatus for operating a dryer to obtain a preselected end moisture retention in a load undergoing drying.

Another object of the invention is to improve the repeatability in percent moisture retention from load to load at various preselected settings of the dryer whereby hard to dry loads are dried to generally the same preselected moisture retention as easy to dry loads.

Another object of the invention is to provide greater flexibility in a dryer control wherein the time accumulated to attain a predetermined dryness condition is employed in conjunction with a preset desired dryness condition to variably extend the drying operation.

The foregoing and other objects of the invention are realized through the provision of control techniques which include presetting a desired dryness condition, testing for a predetermined dryness condition, determining the time accumulated in reaching that predetermined dryness condition, and variably extending the drying operation for an interval beyond the point at which the predetermined dryness condition is sensed as a function of the accumulated time interval and the preselected dryness condition.

According to a preferred embodiment of the invention, a multiposition switch is employed to select any one of a plurality of dryness conditions, a moisture sensing circuit is employed to sense for a predetermined moisture level which is conventionally utilized to terminate operation of a dryer, and means are provided for extending the drying operation by an interval of time which is a function of the selected dryness condition and the time accumulated in sensing for the predetermined moisture level. The means for extending the drying operation includes an extended timing logic circuit which reads the output of a clock system to determine elapsed drying time, reads the output of the switch means which encodes the selected dryness condition and inhibits termination of the drying period for an extended interval determined by both the amount of drying time read from the clock system and the switch means setting read from the switch means encoder.

A timed dry cycle logic circuit is also provided which reads the output of the clock system and the outputs of the moisture selection switch operating in a timed dry cycle mode as a drying time selector switch to provide a conventional timed drying cycle.

Although the preferred embodiment of the invention described herein relates to a dryer having means for sensing the dryness condition of the fabric load by way of a fabric conductivity sensor, it should be appreciated that other variables which provide an indication of the load dryness condition may be sensed for purposes of practicing the invention. For example, rather than sensing fabric conductivity, it may be desirable to sense for static electricity which is increasingly generated by the load as it becomes dry, and extend the drying operation beyond the point at which a predetermined static signal is detected by an interval which is dependent on the elapsed drying time prior to the static signal in conjunction with a preselected dryness condition. Alternatively, the time required to reach a predetermined temperature or humidity condition within a dryer could be used in conjunction with a selected dryness condition as the basis for determining the interval by which a drying operation is to be extended.

BRIEF DESCRIPTION OF THE DRAWINGS

Other objects, features and advantages of the invention, its organization, construction and operation, will best be understood from the following detailed description of a preferred embodiment thereof taken in conjunction with the accompanying drawings, in which:

FIG. 1 is a graph illustrating typical percent moisture retention versus drying time performance curves for present electronic moisture sensing controls;

FIG. 2 is a schedule of add-on times as a function of dryness condition selection and sensed drying time required to give satisfactory drying results when the control of the present invention utilizes a particular moisture sensor;

FIG. 3 generally illustrates a dryer with a control circuit and a dryness selection switch which may be employed in practicing the present invention;

FIG. 4 is a block diagram of a control circuit constructed in accordance with the principles of the present invention and particularly showing the provision of dryness selection logic as an input to an extended time logic circuit;

FIG. 5 is a more detailed block diagram of the apparatus illustrated in FIG. 4, particularly showing the individual decoding and terminating logic circuits;

FIG. 6 is a function chart setting forth the input switch functions utilized in practicing the present invention;

FIG. 7 is a memory state logic chart for the dryer control of the present invention.

DESCRIPTION OF THE PREFERRED EMBODIMENT

1. General Description

Although the present invention is applicable to other types of dryer control systems, it will be discussed below in the environment of a digital dryer control system such as disclosed by Donald E. Janke in his United States patent application entitled "Digital Dryer Control Circuit", Ser. No. 129,008, filed Mar. 29, 1971, now U.S. Pat. No. 3,702,030 and assigned to the same assignee as the present invention. Also, the moisture sensing circuit associated with the control described herein may be a sensing circuit constructed in accordance with the apparatus disclosed by Alvin J. Elders in his United States Pat. No. 3,471,938, also assigned to the same assignee as the present invention, although other moisture sensing circuits which provide a pulse frequency representative of dryness may also be utilized.

Figure 8:
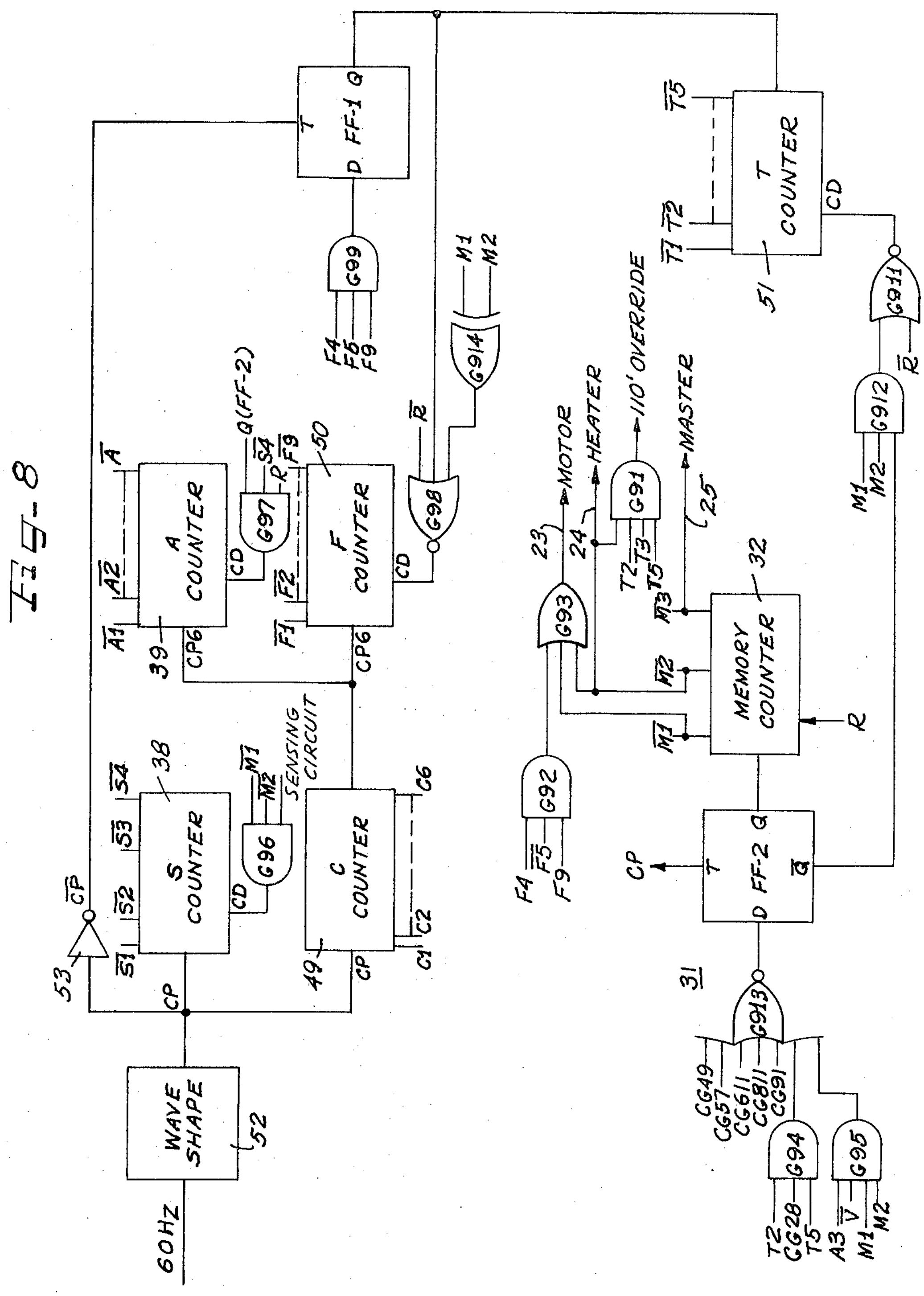
FIGS. 8–17 together form a detailed logic circuit diagram of the apparatus of FIG. 5, FIG. 8 specifically illustrating the inputs and outputs of the control counters, FIGS. 9 and 10 illustrating input switch selection and encoding, FIG. 11 specifically illustrating the time counter decoding circuit, FIG. 12 specifically illustrating the add-on time decoding circuit, FIG. 13 illustrating the timed cycle terminating logic, FIG. 14 specifically illustrating the auto dry terminating logic, FIG. 15 specifically illustrating the add-on time terminating logic, FIG. 16 illustrating the logic for providing a cool-down interval, and FIG. 17 illustrating common gates for decoding particular states of the auto counter of the control.

FIGS. 8–17 together provide a logic circuit diagram for a dryer control constructed in accordance with the principles of the present invention. In FIG. 8, a wave shaping circuit 52 is provided to derive 60 Hz pulses from a conventional 60 Hz line. As can be seen from the drawing, the counters are therefore exercised at a 60 Hz rate or at a fraction of that rate. The S counter 38 is illustrated as a 4-stage counter having a reset input provided from a sensing circuit by way of an AND gate G96. A C counter 49 is driven by the pulses CP simultaneously with the S counter 38. The C counter 49 divides the frequency of the pulses CP to provide pulses, arbitrarily referenced CP6, in that the C counter is illustrated herein as a 6-stage counter.

The pulses CP6 are employed to exercise the A counter 39 and the F counter 50. The A counter 39 is the auto counter of the system which is repetitively reset by way of an AND gate G97 from the $\overline{S4}$ output of the S counter 38 until such time as the sensing circuit repetitively resets the S counter 38 at a rate sufficient to prevent the S counter 38 from providing a logical 1 at its $\overline{S4}$ output. The A counter 39 generates times for the auto dry, add-on and cool down portions of the drying program. The F counter 50 generates 5-minute periods in the auto dry, time dry and anti-wrinkle portions of a drying program, the 5-mintue periods being read by an AND gate G99 which operates a flip-flop FF-1 to feed pulses every five minutes to the T counter 51.

The T counter 51 records drying time and excessive or override drying time in the auto dry cycle, generates drying time signals in the time dry cycle, and generates a 150-minute timing period in an anti-wrinkle portion of the drying program. The T counter is reset upon indexing of the memory counter 32 by way of a flip-flop FF-2 and a plurality of gates G94, G95 and G913 which read the outputs of the T counter 51, the A counter 39, the memory counter 32 and certain ones of the logic circuits illustrated in FIGS. 9–17.

In addition to providing a plurality of outputs for use in logical determination of operating conditions in FIGS. 8-17, the memory counter 32 is connected to the output control conductors 23–25 for controlling the motor, heater and master power application of the dryer. These output leads may, of course, be connected to the intermediate switching devices, such as relays and/or relay driver circuits.

Figure 9:
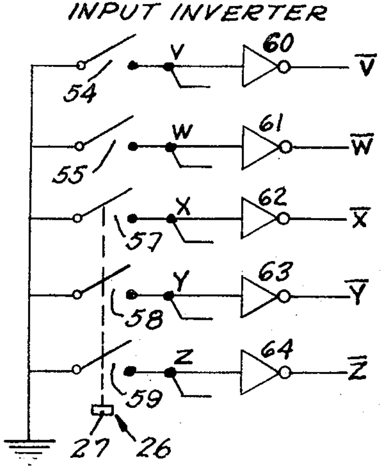

FIG. 9 illustrates a plurality of switch contacts of the selection switch 26 and switch contacts for selecting anti-wrinkle and timed or automatic dry cycle operation. These switches are manipulated by an operator to selectively encode a drying program for the dryer. FIG. 9 also illustrates a plurality of inverter circuits 60–64 which, together with a plurality of AND gates G11-G18 of FIG. 10, decode the selected program for utilization by other logic circuits of the dryer control. It should be noted that in each of the circuits of FIGS. 8–17, the output conductors of gate circuits have been given reference characters that are identical with their respective gate circuit designations and prefixed by the letter "C" for ease in determining signal derivation throughout the drawings.

Figure 11:
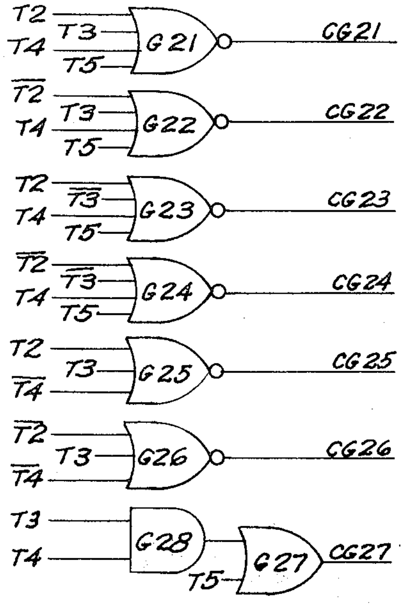

The outputs of the T counter 51 are decoded by the time counter decoding circuit 44 of FIG. 11 which comprises a plurality of OR gates G21–G27 and an AND gate G28.

Figure 13:
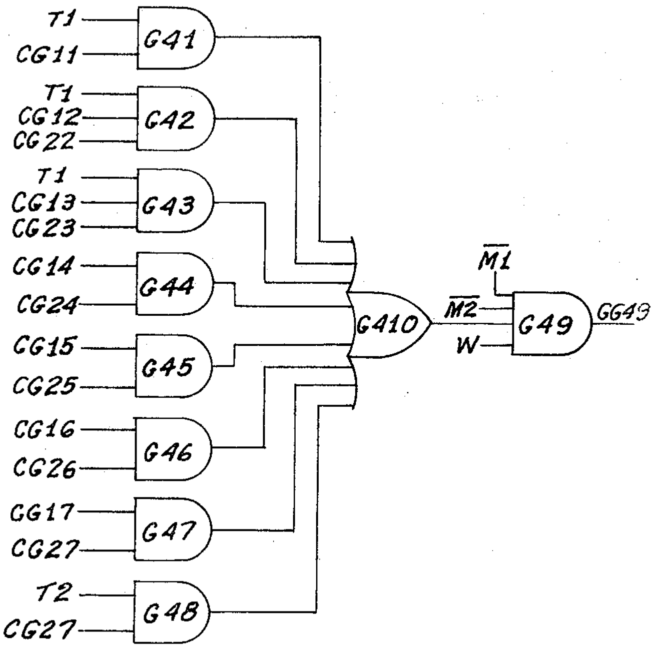

The timed cycle operation is controlled by the circuit of FIG. 13 which includes a plurality of AND gates G41–G49 and an OR gate G410. A logical 1 at the output of the AND gate G49 terminates the timed drying operation. The timed cycle circuit 41 reads primarily the outputs of the circuits of FIGS. 10 and 11 for this purpose.

Figure 10:
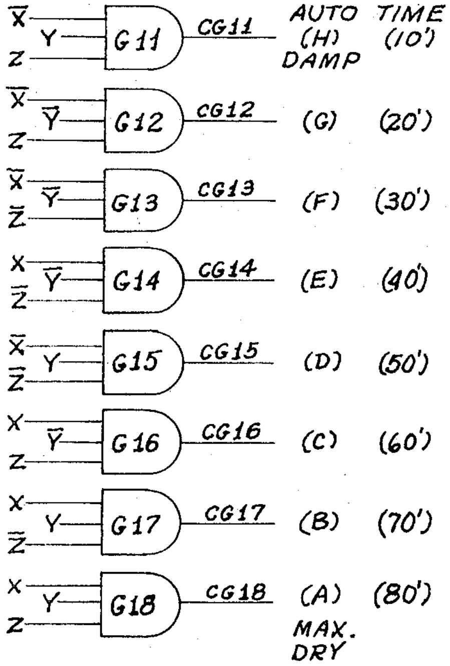
Figure 12:
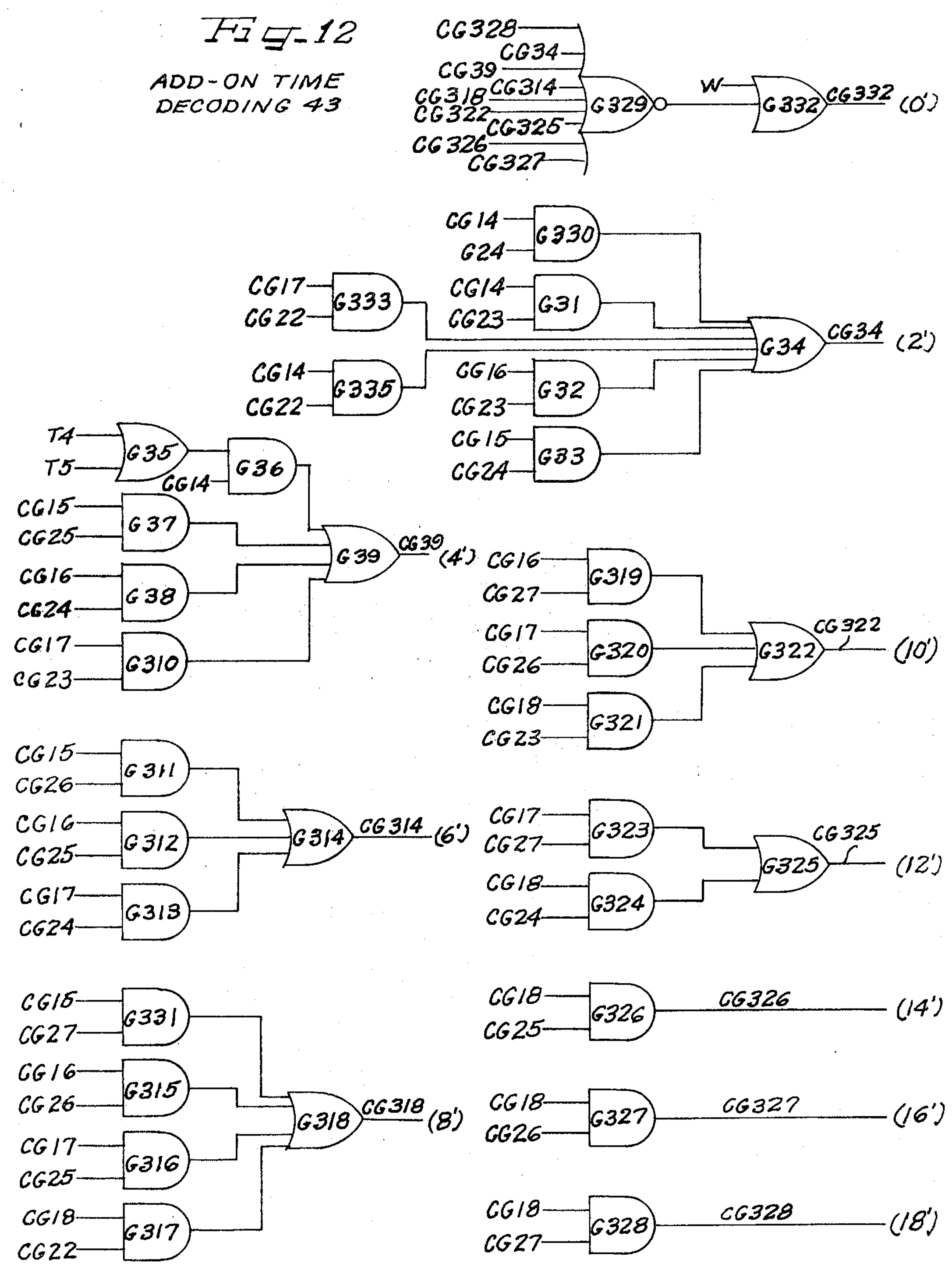

FIG. 12 illustrates the add-on time decoding circuit 43 which reads the outputs of the control settings established through the apparatus of FIGS. 9 and 10 and the decoded output of the T counter 51 via the decoding circuit 44 of FIG. 11 to determine the required additional drying time for the extended drying operation.

Figures 14, 15, 16, 17:
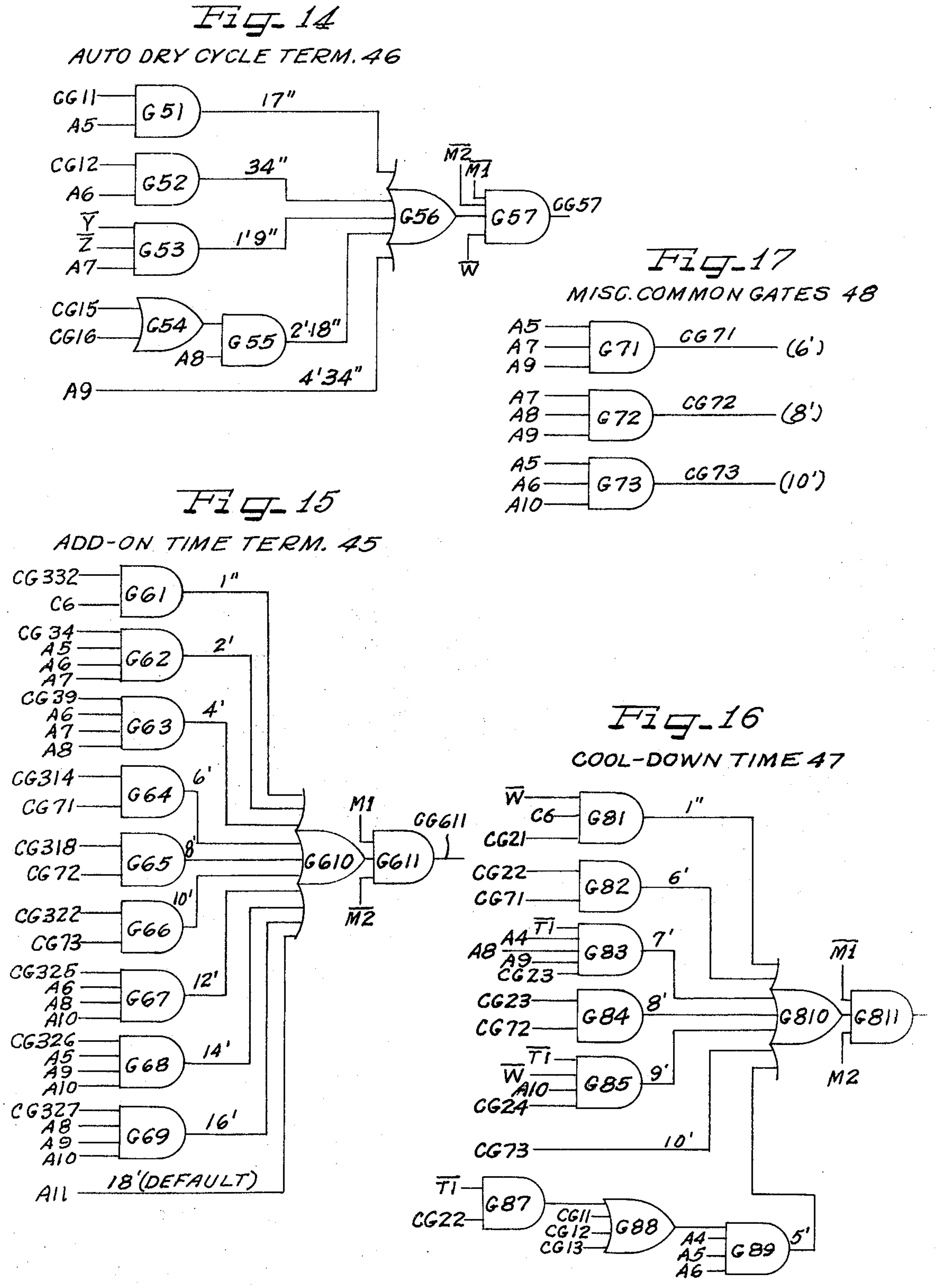

The auto dry cycle decoding circuit is illustrated in FIG. 14 as comprising a plurality of AND gates G51–G53, G55 and G57, and a pair of OR gates G54 and G56 which read the outputs of the circuits illustrated in FIGS. 9 and 10 in conjunction with certain outputs of the A counter 39 to terminate the auto dry operation when the output of the gate G57 goes to a logical 1 during the time that the memory counter 32 is in a binary state of 000.

The add-on time determined by the add-on time decoding circuit 43 of FIG. 12 is effective to extend the drying period by way of the add-on time terminating circuit 45 of FIG. 15. For example, if an add-on time of two minutes is decoded in FIG. 12, the OR gate G34 provides an input to the add-on time terminating circuit 45 of FIG. 15. This input CG34 is applied to an AND gate G62 in conjunction with the A5, A6 and A7 outputs of the A counter 39 so that after a 2-minute timing period the output of the AND gate G611 goes to a logical 1 to advance the control to a cool down interval. As can be seen in the drawings, the add-on time terminating circuit 45 includes a plurality of AND gates G61–G69 and G611, an OR gate G610 and a wired input from the All stage of the A counter 39 to terminate the add-on time by default after 18 minutes in this particular example. The AND gates G61–G69 read the outputs of the add-on time decoding circuit 43 and the outputs of the A counter 39, either directly or by way of the common gates G71–G73 of FIG. 17.

A cool down interval is provided by the cool down time circuit 47 illustrated in FIG. 16. The cool down time circuit 47 includes a plurality of AND gates G81–G85, G87, G89 and G811 and a pair of OR gates G88 and G810 for reading the outputs of the selection circuits of FIGS. 9 and 10, the time counter decoding circuit 44 of FIG. 11, the T counter 51, the A counter 39, and the add-on time terminating circuit of FIG. 15, among others, in connection with the state of the memory counter 32 to provide timed cool down intervals until the gate G11 goes to a logical 1 to advance the control to an anti-wrinkle function. In FIG. 8, the anti-wrinkle function is decoded and terminated by way of a pair of AND gates G94 and G95 in conjunction with a NOR gate G913 and the flip-flop FF-2 of the memory indexing circuit 31. The gate G94 is controlled by the time counter decoding circuit 44 and the T counter 51 to terminate the anti-wrinkle operation after, for example, 120 minutes. The AND gate G95 provides only a 4-minute anti-wrinkle operation if the option switch cancels this function. The gate G95 is controlled by the switch contact 54 in FIG. 9, the A3 stage of the A counter 39, and the state of the memory counter 32.

2. Detailed Description

Referring to FIG. 1, a family of dryer performance curves 1, 2 and 3 is illustrated as a plot of percent moisture retention versus drying time. Sensing circuit performance curves 8 and 9, representing a normal and a maximum dryness selection respectively, are plotted on the drying curves. Points 91, 92, 93 represent the percent moisture retention of three different loads at the end of the drying operation for the same maximum dryness selection when an electronic sensor is utilized to terminate the operation. As the drying difficulty of the fabric load varies (curve 1 to curve 3), the difference between the percent moisture retention achieved at the end of the drying operation (points 91, 92, 93) and that selected (max.) also varies. An analogous situation exists at the normal dry selection, point 81, 82, 83 and selection NOR. Therefore, additional drying time must be added to the drying operation for more difficult loads to achieve the same dryness condition as that achieved for the less difficult loads at a common setting of the dryness selector. This amount of time added, intervals 4, 5, 6 or 7, to the sensed drying operation to achieve the selected dryness condition depends on the length of time required to reach the sensed dryness condition and the dryness condition selected.

FIG. 2 is a schedule of add-on times which are derived in practicing the present invention through the utilization of preselected dryness conditions and sensed drying time elapsed in attaining a predetermined dryness condition. It can be seen in FIG. 2 that in this particular example, all dryness conditions above damp-dry conditions generally require the addition of an extended drying interval for most loads which require a drying time above ten minutes. Therefore, for most types of fabric loads, the drying program is altered as a function of the selected dryness condition and elapsed sensed drying time in attaining the preselected dryness condition. The program illustrated in FIG. 2 is only representative of add-on times and any particular program is primarily determined by the amount of departure between the desired and actual moisture retentions suggested in FIG. 1.

Referring to FIG. 3, a dryer is generally illustrated at 10 as comprising a drum 11 having a rear wall 11*a*. The drum 11 is rotated by a motor 12 via a belt 13 to tumble a load. The motor 12 is also utilized to drive a fan (not shown) for effecting a flow of air, as indicated at 14, through the drum 11 by way of an inlet duct 15 and an outlet duct 16 having a filter 17 therein. The flow of air 14 is heated by a heater 18 disposed in the inlet duct 15.

The tumbling load periodically contacts a sensor 19 having a pair of electrodes 20 and 21 which are connected to a control circuit 22 which also receives (or derives from the line waveform) 60 Hz timing pulses and controls the operation of the dryer by way of a plurality of outputs including an output 23 connected to the motor 12, an output 24 connected to the heater 18 and an output 25 for controlling the application of power to the dryer. The control circuit 22 is also provided with a plurality of inputs V, W, X, Y and Z as means for programming the dryer. The input V is provided to receive a signal for altering the drying program to include an anti-wrinkle cycle. The input W represents a cycle selection function whereby the program is altered to provide an automatic or a timed drying operation. The inputs X, Y and Z are received from a multi-position dryness selection switch 26. The switch 26, as an example, may be an 8-position switch and may function in two modes of operation, namely the automatic cycle and the timed cycle operations. Accordingly, the switch 26 carries separate indicia 28, 29 for the respective cycles. The switch 26 is set to a preselected dryness condition (or a predetermined time) by means of a control handle 27.

FIG. 4 is a block diagram of the control circuit 22 of FIG. 3. The control circuit 22 includes a clock system 30 which receives the 60 Hz timing pulses and the input signals from the dryness sensing circuit and a memory indexing circuit 31 operated by the clock system 30 to index a memory 32 which provides the outputs 23–25 for controlling the operation of the dryer. The memory 32 includes feedback outputs 33 and 35 to the memory indexing circuit 31 and the clock system 30, respectively, for indicating the operational state of the memory to these circuits. The system thus far described is generally the system disclosed in the aforementioned Janke application Ser. No. 129,008. The control circuit 22 also includes an extended time logic cirucit 37 which is connected between the clock system 30 and the memory indexing circuit 31 to control operation of the memory indexing circuit 31 and thus prevent termination of the drying operation for an extended period. This feature per se is the primary basis for the invention disclosed in the aforesaid Janke et al application Ser. No. 198,354. The extended time logic circuit 37 is also provided with a feedback connection 34 from the memory 32. According to the present invention, a dryness selection logic circuit 36 may be employed in connection with the above described control to feed dryness selection data to the extended time logic circuit 37 for use in connection with the accumulated drying time for deriving add-on time for extending the drying operation. The dryness selection logic circuit 36 may also be employed to select a predetermined drying period when the control circuit 22 is conditioned to operate in accordance with a timed drying cycle.

The memory circuit 32 may be a shift register or a binary counter having a plurality of independent states which correspond to various operations of a drying cycle. The memory is indexed sequentially through a program of memory states by the memory indexing circuit 31 which receives input signals from the clock system 30 and the exended time logic circuit 37. The clock system 30 comprises a digital counter for receiving timing pulses which may be derived from a conventional 60 Hz line. The clock system 30 provides a signal to the extended time logic circuit 37 at such time as the sensor signal is received indicating a predetermined moisture level. The logic circuit 37 reads the amount of time accumulated during the sensed drying operation from a portion of the clock system 30, reads the selected dryness condition from the dryness selection logic circuit 36 and allows the drying operation to continue for an amount of time which is determined as a function of the sensed drying time accumulated before the sensor signal and the preset dryness condition to initiate operation of the memory indexing circuit 31. When energized, the memory indexing circuit 31 develops a pulse for sequencing the memory 32 to the next logic state of the drying program.

FIG. 5 is a more detailed block diagram of the control circuit 22. In FIG. 5, the block system 30 may be seen to comprise three separate counters, an S counter 38, an A counter 39, and an F & T counter 40. The S counter 38 is associated with the sensing circuit and is operated by the 60 Hz pulses to reset the A counter 39 upon the accumulation of a predetermined number of pulses, unless such accumulation is prevented by the receipt of a reset pulse from the sensing circuit. Therefore, repetitive reset pulses from the sensing circuit to the S counter 38 will permit the A counter 39 to operate without reset. The remaining portions of the clock system 30 provide the time base for both the sensed drying operation and a conventional timed drying operation and their functions will be best understood from the description below related to the logic circuit of FIGS. 8–17.

In addition to the extended time logic circuit 37, a timed dry circuit comprising a time counter decoding logic circuit 44 and a timed dry terminating logic circuit 41 are provided. The time counter decoding logic circuit 44 is connected between the F & T counter 40 and the timed dry terminating logic circuit 41 and an add-on time decoding logic circuit 43. In a timed drying operation, the time counter decoding logic circuit 44 is operable to read time from the F & T counter 40 and operate the timed dry terminating logic circuit 41 in conjunction with the time setting of the switch 26 by way of the dryness selection decoding logic circuit 42 to effect indexing of the memory 32. In an auto dry cycle, the time counter decoding logic circuit 44 feeds elapsed time data to the add-on time decoding logic circuit 43 for use in conjunction with the selected dryness setting of the switch 26 by way of the dryness selection decoding logic circuit 42 to control memory indexing. This latter control of memory indexing involves the utilization of the outputs of the add-on time decoding logic circuit 43 by an add-on time terminating logic circuit 45 in conjunction with a period of operation of the A counter 39 defined by these outputs to control operation of the memory indexing circuit 31. An auto dry terminating logic circuit 46 is connected to read the output of the A counter 39 and the output of the dryness selection decoding logic circuit 42 and is inhibited from terminating an automatic drying operation by preventing its ability to effect operation of the memory indexing circuit 31 until termination of the extended drying interval.

Referring to FIGS. 3 and 6, the functions of the switch inputs V, W, X, Y and Z will be appreciated. In this embodiment, a closed contact is a logic 0, an open contact a logic 1. As will be more specifically described below, the switch 26 provides three binary coded inputs X, Y and Z from its eight selection positions for both timed and sensed cycles. In this particular example, positions A-H extend over a range from damp dry to maximum dry and correspond in switch position to ten minutes to 80 minutes for the time dry cycle.

FIG. 7 illustrates four memory states defining the operations of drying, an extended drying period, tumble with no heat, an anti-wrinkle cycle, and an off-state as the basic states for a complete dryer program. These particular memory states and their corresponding dryer functions will be better understood from the following description.

Referring to FIGS. 8–17, a detailed drawing of the apparatus of FIG. 5 is illustrated. The operation of the circuits will be appreciated from the following examples.

In selecting the automatic drying cycle, an operator positions a selection switch 55 to the closed position providing W = 0 and locking out the timed cycle gates at a gate G49 (FIGS. 9 and 13). The switch 26 is set at a desired dryness condition, here assumed condition C wherein X and Z = 1 and Y = 0, that is, the contacts 57 and 59 of the switch 26 are open and the contact 58 is closed. Also assume that the switch contacts 54 are closed so that the input V = 0 so that the anti-wrinkle cycle is not selected.

When the cycle is started, an internal signal R is a logical 0 for 0.05 seconds, and then changes to logical 1. The signal R may be generated by any of several well known means such as an RC circuit. When the input signal R is a logical 0, the memory stages of the memory counter 32 are set to a logical 0 indicating a drying operation. Simultaneously, the S counter 38 and a simultaneously driven C counter 49 begin operation in response to the receipt of shaped clock pulses CP from a wave shaping circuit 52. The S counter 38 comprises four stages which repetitively reset the A counter 39 on each overrun by means of the gate G97. The C counter provides a clock pulse CP6 for operating the A counter 39 and the F counter 50. Every 5 minutes, the F counter 50 provides logical 1's on its outputs F4, F5, and F9 to operate a flip-flop FF-1 by way of a gate G99. Therefore, every five minutes, a change of state of the flip-flop FF-1 causes the T counter 51 to accumulate time. As the fabric load attains a predetermined dryness condition, the sensing repetitively resets the S counter 38 by way of a gate G96. The frequency of repetitive resetting of the S counter 38 is greater than the frequency of occurrence of a high $\overline{S4}$ signal so that the S counter 38 is prevented from resetting the A counter 39. Therefore, as the A counter 39 accumulates time, an AND gate G55 (FIG. 14) will provide a logical 1 signal with the inputs from the gate G54 and the A8 output of the A counter 39. The gate G54 provides a logical 1 in that the gate G16 (FIG. 10) is enabled by way of the switch configuration previously established in FIG. 9 in selection of a desired dryness condition. When the gate G55 provides the logical 1 signal, the OR gate G56 will provide a logical 1 signal to effect a logical 1 signal at the output of the AND gate G57.

The memory counter 32 is indexed to the logic state 100 by way of a flip-flop FF-2 and a gate G913 when the gate G57 provides the logical 1 signal. Indexing of the memory counter terminates the automatic dry cycle; however, at this time, the add-on dry operation begins. As an example, if the sensed elapsed time is 25 minutes and the dryness condition selector is set at the position C, the add-on time taken from FIG. 2 is 2 minutes. At this time, the A counter 39 has been reset by the Q output of the flip-flop FF-2 and again begins counting. The S counter 38 is locked out by the input of a logical 0 from the memory counter output $\overline{M1}$ into the AND gate G96. An OR gate G34 (FIG. 12) provides a logical 1 signal indicating a 2 minute add-on time by way of an AND gate G32 which receives the dryness selection signal from the AND gate G16 and a sensed dry time signal representing 25 minutes from the gate G23 (FIG. 11) which reads the output signals of the T counter 51. Therefore, the add-on time of 20 minutes is dependent on the dryness condition selection and the length of sensed drying time. When the A counter 39 has accumulated two minutes of time, an AND gate G611 will terminate the extended drying operation by way of an OR gate G610 and an AND G62 (FIG. 15). The logical 1 inputs to the gate G62 are provided by way of the gate G34 of the add-on time decoding circuit of FIG. 12 and from the A counter 39 upon counting a 2-minute interval. The memory will be indexed to a cool down operation, terminating the drying operation, and by steps similar to that set forth above, the memory will be indexed to an OFF state to terminate operation of the appliance. A timed override circuit, the gate G91 of FIG. 8, is provided to terminate a drying operation whenever such an operation proceeds for an extended period of time without the occurrence of a termination signal from the dryness sensor. As can be seen, gate G91 is connected in this particular example to operate in response to logical 1 outputs from the second, third and fifth stages of the T counter 51 and provides a 110′ override interval.

For timed cycle operation, the switch contact 55 is open. The time cycle operation utilizes the F counter 50, the T counter 51, the memory counter 32, the dryness condition selection logic circuit 42 of FIGS. 9 and 10, the time decoding logic circuit 44 of FIG. 11, and the timed cycle logic circuit 41 of FIG. 13 in a manner of operation similar to that set forth above. The S counter 38 and the A counter 39 operate, but are locked out and have no effect due to the input W = 1 which inhibits the automatic drying cycle operation at the gate G57 in FIG. 14. The extended time logic circuit is utilized during a timed drying operation, but always adds on one second by way of the gates G332 and G61 of FIGS. 12 and 15, respectively. The cool down and termination proceed as in the automatic drying cycle. In this case, the AND gate G811 of FIG. 16 provides a logical 1 to operate the flip-flop FF-2 by way of the gate G913 (FIG. 8) for indexing the memory counter 32.

It will be appreciated that the type of logic circuits specifically illustrated and discussed herein and the particular circuitry employed in this particular embodiment of the invention merely illustrate one technique for practicing the invention. For example, negative logic, such as disclosed in the aforementioned Janke et al. application may be employed in place of the positive type logic illustrated in the instant drawings.

Other changes and modifications may become apparent to those skilled in the art without departing from the spirit and scope of my invention and it is to be understood that I intend to include within the patent warranted hereon, all such changes and modifications as may reasonably and properly be included within the scope of my contribution to the art.

The embodiments of the invention in which an exclusive property or privilege is claimed are defined as follows:

1. A fabric drying apparatus comprising:
a chamber for receiving a fabric load to be dried;
heating means for supplying heat to said chamber; and
control means for controlling the drying operation, said control means comprising
means for selecting a dryness condition, including
switch means, and encoding means for providing settings of said switch means as logical signals, sensing means for sensing the moisture content of the fabric in said chamber, timing means for timing the drying operation up to the point where a predetermined dryness condition is sensed, and means for extending the drying operation beyond the point of the sensed predetermined dryness condition by an interval that is a function of the selected dryness condition and the drying time accumulated in attaining the predetermined dryness condition.

2. A fabric drying apparatus according to claim 1, wherein said timing means includes digital counting means operable to provide digital signals representing accumulated time and said means for extending the drying operation includes means for reading the digital signals of said timing means and the digital signals of said selecting means.

3. A fabric drying apparatus according to claim 1, wherein said switch means includes a multi-position manually operable switch and said encoding means is operable to provide a unique set of logical signals for each switch position.

4. A fabric drying apparatus according to claim 3, comprising means for decoding the logical signals of said selecting means as unique time intervals and means for operating said drying apparatus for fixed time intervals in response thereto.

5. A fabric drying apparatus comprising:

a chamber for receiving a fabric load to be dried;

heating means for supplying heat to said chamber; and control means for controlling the drying operation, said control means comprising means for selecting a dryness condition including switch means operable to select a dryness condition within a predetermined range of dryness conditions, sensing means for sensing the moisture content of the fabric in said chamber, timing means for timing the drying operation up to the point where a predetermined dryness condition is sensed, and means for extending the drying operation beyond the point of the sensed predetermined dryness condition by an interval that is a function of the selected dryness condition and the drying time accumulated in attaining the predetermined dryness condition.

6. A method of controlling a fabric drying apparatus comprising the steps of:

selecting a desired dryness condition of a fabric load by encoding a set of logical signals representing the desired dryness condition;

initiating a fabric drying operation; continuing the fabric drying operation until a predetermined sensed dryness condition is reached;

extending the fabric drying operation beyond the time at which the predetermined sensed dryness condition is reached by an interval of time which is dependent upon the logical signals encoded representing the desired dryness condition selected and the time required to reach the sensed dryness condition; and terminating the fabric drying operation at the end of the extended interval.

7. A method according to claim 6, wherein the step of continuing the fabric drying operation includes the step of timing the drying operation until the predetermined dryness condition is sensed.

8. In a dryer control of the type including an indexable memory device having a plurality of states which correspond to a program of dryer operations, means for indexing said memory, moisture sensing means, and a source of timing signals used to control dryer operations which are not sensed, the improvement comprising:

a first time accumulating circuit operable to accumulate and store a signal indicative of the time required for the sensing means to indicate that a fabric load has attained a predetermined apparent moisture content;

a second time accumulating circuit operable to accumulate time after the sensing means indicates that the predetermined moisture content has been attained;

selection means for selecting a desired moisture content;

and circuit means connected to said first and second time accumulating circuits and to said selection means and operable to produce a signal for indexing the memory when said second time accumulating circuit has accumulated an amount of time which is dependent upon the amount of time stored in said first time accumulating circuit and the moisture content selected by said selection means.

9. The dryer control of claim 8, wherein said selection means includes multi-position switch means and means for encoding selection positions of said switch means a unique signals representing respective moisture contents.

* * * * *